(12) United States Patent
Kendrick et al.

(10) Patent No.: US 7,478,591 B2
(45) Date of Patent: Jan. 20, 2009

(54) TWINEBALL STORAGE FOR BALERS

(75) Inventors: Patrick Kendrick, Hesston, KS (US);
Thomas G. Schrag, Hesston, KS (US);
Jeffery A. Baldauf, Hesston, KS (US);
Linda L. Heidebrecht, Newton, KS (US)

(73) Assignee: AGCO Corporation, Duluth, GA (US)

( * ) Notice: Subject to any disclaimer, the term of this patent is extended or adjusted under 35 U.S.C. 154(b) by 119 days.

(21) Appl. No.: 11/419,154

(22) Filed: May 18, 2006

(65) Prior Publication Data
US 2007/0266865 A1 Nov. 22, 2007

(51) Int. Cl.
*B65B 13/00* (2006.01)
(52) U.S. Cl. .................. 100/3; 100/912; 242/129; 242/137.1; 242/141; 242/594.1; 242/594.6
(58) Field of Classification Search .................. 100/3, 100/5, 34, 912; 56/132, 133; 221/67, 175–184; 211/85.5, 44, 125; 206/389, 391, 392; 242/141, 242/146, 137.1, 129, 594.1, 594.6
See application file for complete search history.

(56) References Cited
U.S. PATENT DOCUMENTS

| 2,477,059 | A | * | 7/1949 | Hill | 242/137.1 |
|---|---|---|---|---|---|
| 2,989,172 | A | * | 6/1961 | Stoll | 206/409 |
| 3,028,117 | A | * | 4/1962 | Shepley | 242/129 |
| 3,214,113 | A | * | 10/1965 | Murray et al. | 242/129 |
| 3,241,790 | A | * | 3/1966 | Hudgins | 242/129 |
| 4,258,540 | A | | 3/1981 | Munro | |
| 4,386,561 | A | | 6/1983 | Viaud et al. | |
| 4,956,968 | A | | 9/1990 | Underhill | |
| 5,349,806 | A | | 9/1994 | Swearingen et al. | |
| 5,522,565 | A | | 6/1996 | Deshales | |
| 5,783,816 | A | * | 7/1998 | McPherson | 250/231.13 |
| 5,855,166 | A | | 1/1999 | McPherson | |
| 6,247,291 | B1 | | 6/2001 | Underhill | |
| 6,857,251 | B2 | * | 2/2005 | McClure et al. | 53/587 |
| 7,140,293 | B1 | * | 11/2006 | Rotole et al. | 100/34 |
| 7,162,950 | B2 | * | 1/2007 | McClure et al. | 100/8 |
| 2003/0226334 | A1 | | 12/2003 | McClure et al. | |
| 2004/0017773 | A1 | | 1/2004 | Piche et al. | |

* cited by examiner

*Primary Examiner*—Jimmy T Nguyen
(74) *Attorney, Agent, or Firm*—Hovey Williams LLP

(57) ABSTRACT

Cylindrical twineballs are stored on their sides with the twine dispensing end of each ball facing outwardly away from the baler to facilitate operator access. The twineballs are stored in a pattern consisting of horizontal rows and upright columns, with the upright columns inclined laterally so as to present an overall, generally skewed parallelogram effect to maximize the packing density within a given amount of space. The balls are supported within cradles that may advantageously be interconnected to present multiple, horizontally extending, transversely corrugated shelves. The shelves are upwardly and outwardly inclined to help retain the balls in place.

52 Claims, 9 Drawing Sheets

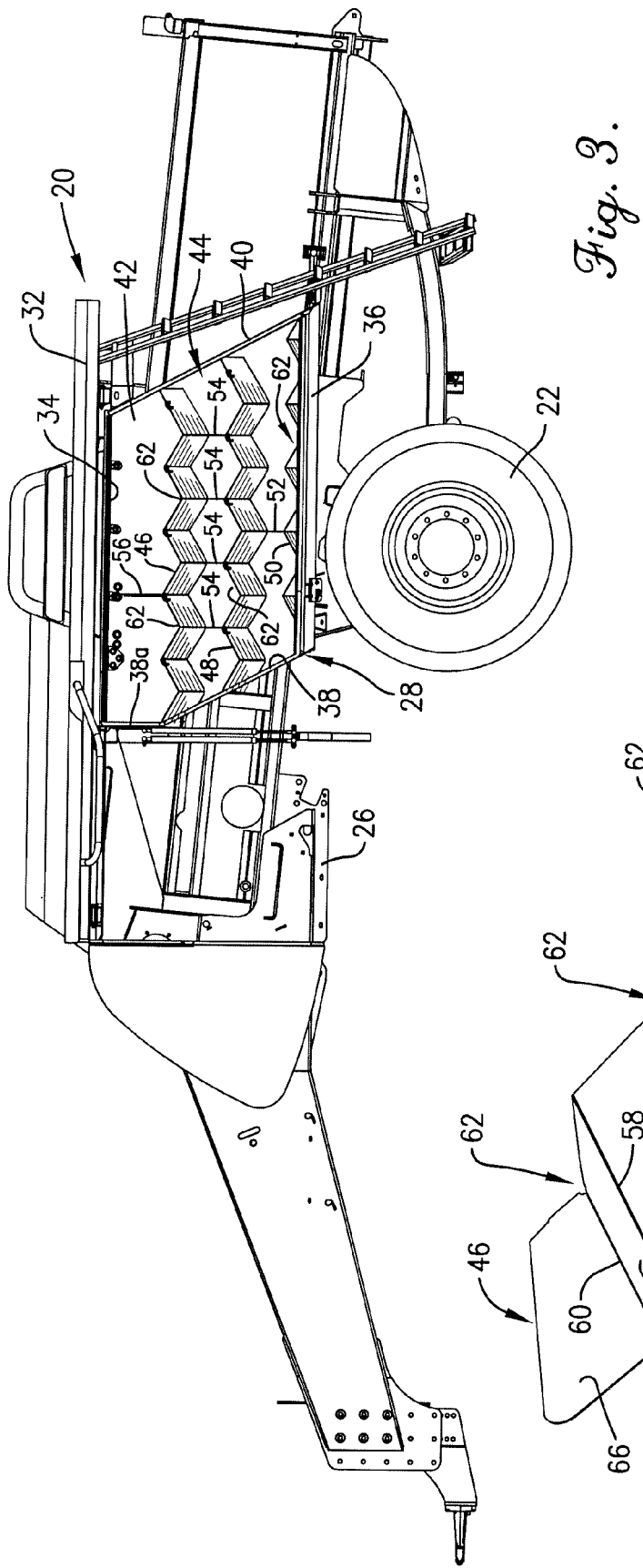
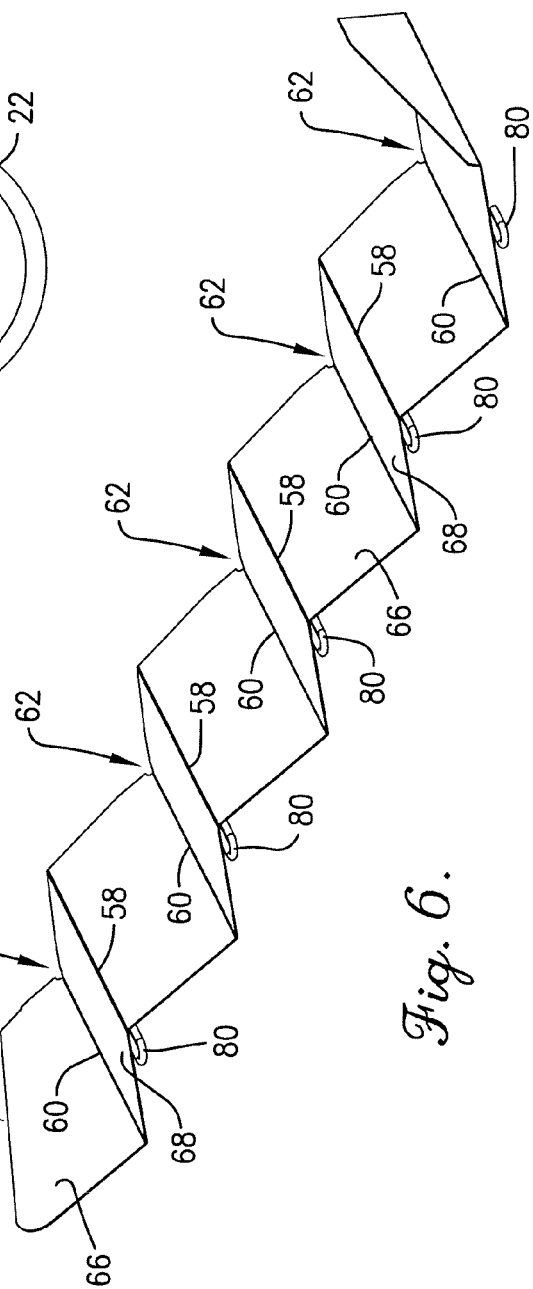
Fig. 3.
Fig. 6.

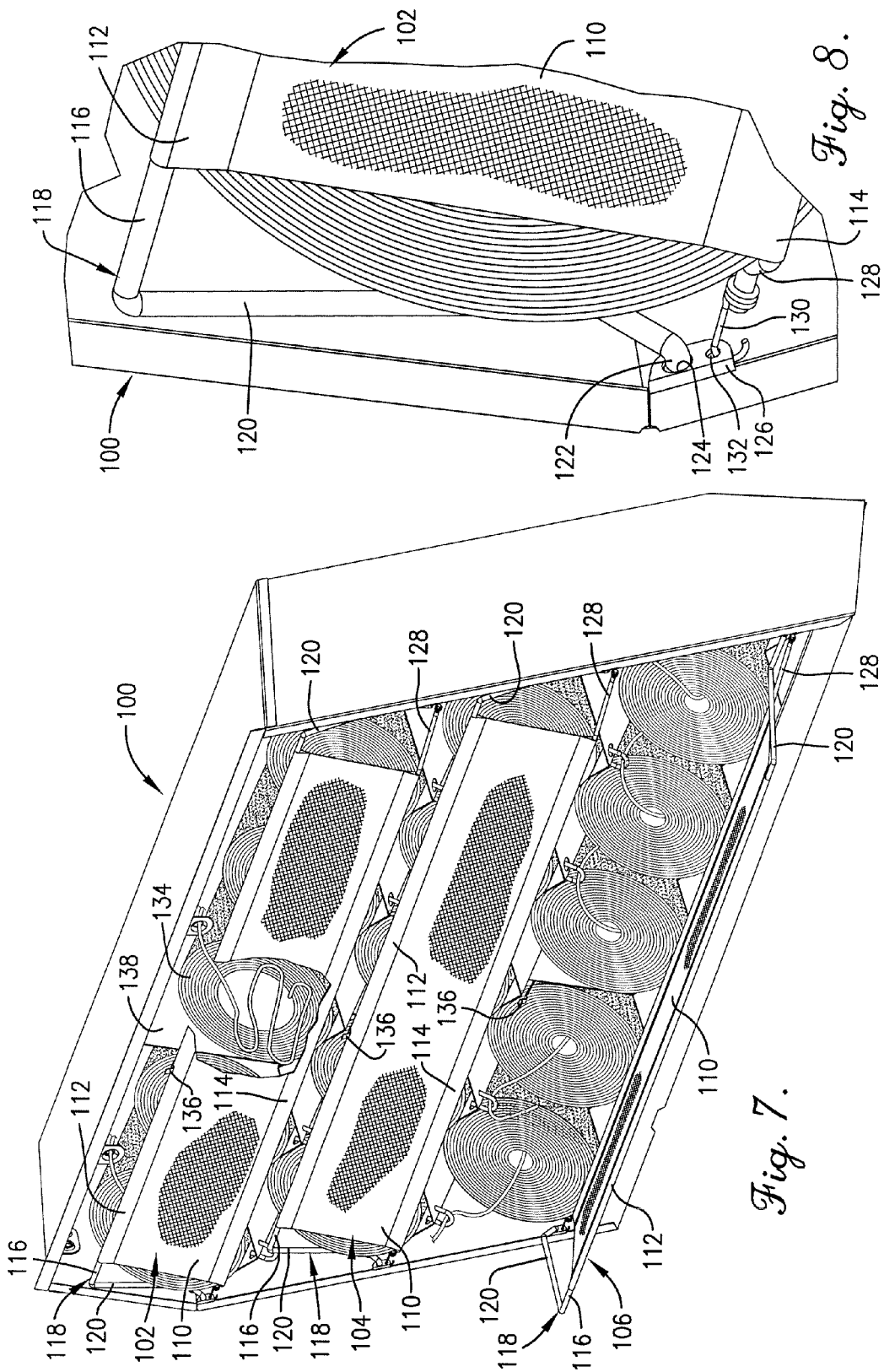

TWINEBALL STORAGE FOR BALERS

TECHNICAL FIELD

The present invention relates to crop baling equipment and, more particularly, to means for storing twineballs on balers in a way that saves space and makes them more accessible to the operator.

BACKGROUND AND SUMMARY

It is well known in the art to wrap compressed bales of crop materials, both "round" and "rectangular", with twine while still in the baler so as to maintain the shape and integrity of the bale after it is ejected from the baler. Twine is typically dispensed from generally cylindrical twineballs standing on end on horizontal storage shelves on the baler. The balls are usually spliced together so that when one ball is completely depleted, twine automatically starts unwrapping from the next ball without requiring operator intervention. Eventually, all of the balls are used up and the operator must restock the shelves and splice the new supply of balls together in the appropriate manner.

In the present invention a crop baler is provided with twineball storage means that supports the cylindrical twineballs on their sides, with one end facing outwardly away from the baler. Among other things, having the ends of the twineballs face outwardly toward the operator makes it much easier and more convenient as he loads the storage compartment and splices the balls together. Furthermore, having the twineballs face outwardly allows the shelves to be spaced closer together than in the past because the operator no longer needs extra room between the top of the twineballs and the next shelf to splice the twines together. Preferably, the twineballs are supported in an upward and outwardly inclined or tilted up manner to encourage them to stay in place by the force of gravity. This arrangement maximizes the number of twine balls that can be stored within a given amount of space, or, conversely, minimizes the amount of space required for a given number of twine balls. Therefore, the operator has better access to parts of the baler mechanism around and behind the twine storage compartment for servicing and maintaining the baler.

In a preferred embodiment, the twineballs are arranged in horizontal rows and vertical columns, with each row being slightly offset or staggered with respect to the next row above and below. Thus, the upright columns are inclined so as to present an overall pattern that resembles a skewed parallelogram. By having the centers of the twineballs located midway between the centers of twine balls in the next row above or below, the maximum number of balls can be stored in the least available space. In a preferred embodiment, the balls of each row may be supported in a series of individual cradles or troughs formed by pairs of downwardly converging bottom walls that are interconnected with one another to present a single transversely corrugated shelf.

BRIEF DESCRIPTION OF THE DRAWINGS

FIG. 3 is a left side elevational view thereof;

FIG. 6 is an enlarged isometric view of one of the shelves of the twine box;

FIG. 7 is an isometric view of an alternative embodiment wherein the twine box is provided with swing-down fabric guards for preventing the accidental unspooling and escape of twine from the twineballs;

FIG. 8 is an enlarged, fragmentary isometric view of one end of a shelf in the embodiment of FIG. 7 illustrating details of construction;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
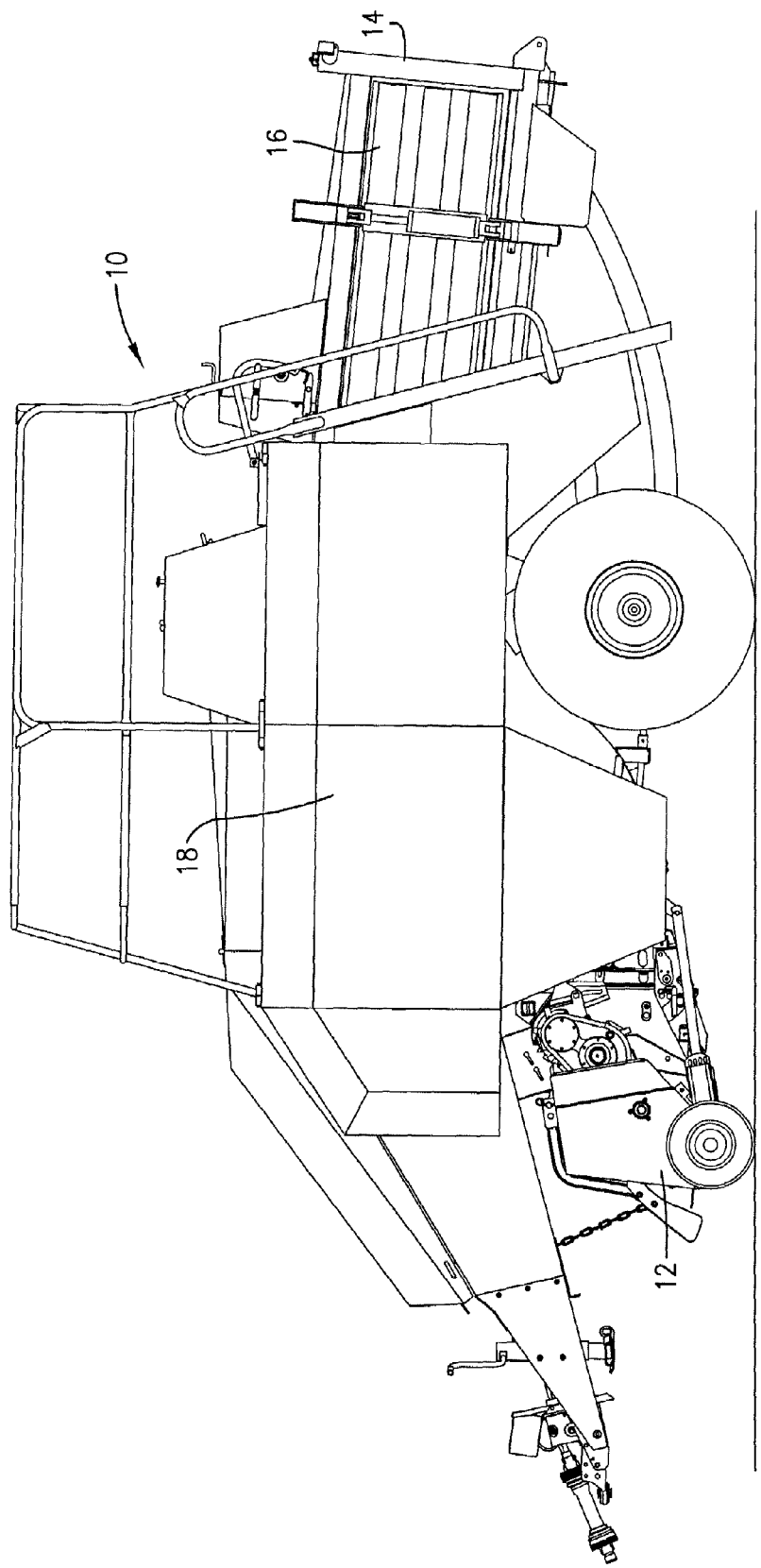
FIG. 1 is a side elevational view of a typical prior art large rectangular baler of the type which could be provided with a twineball storage arrangement in accordance with the principles of the present invention.

The prior art baler 10 chosen for illustration in FIG. 1 happens to be similar in configuration to the baler shown and described in U.S. Pat. No. 6,679,042 which is owned by the assignee of the present invention. The '042 patent is hereby incorporated by reference into the present specification, although it will be understood that the principles of the present invention are not limited to any particular type of rectangular baler and may, in fact, be utilized in conjunction with round balers as well.

Suffice it to point out, therefore, that baler 10 in FIG. 1 picks up hay from the ground with a pickup 12 as the machine is towed through a field. Successive charges of picked up crop materials are fed up into an internal, generally fore-and-aft extending bale chamber (not shown) where they are acted upon by a reciprocating plunger that compacts the charge and pushes it rearwardly in the chamber toward a rearmost open end 14. As the charges are pushed rearwardly, opposite sides of the forming bale are squeezed by adjustable sidewalls 16 that cause resistance to movement, thereby causing previous charges to provide a backstop against which new charges may be compressed. After a sufficient number of charges have been compressed to provide a bale of the desired length, twine is placed around the bale and knotted so that the bale will not lose its integrity and shape after it is discharged from the baler through the open end 14. In the illustrated embodiment, the twine is supplied from balls stored behind an upwardly hinging side panel or door 18 of the baler.

FIGS. 2-6 disclose a baler 20 constructed in accordance with the principles of the present invention. Although not all portions of baler 20 are illustrated in the figures, it is to be understood that, except for the twine storage features, baler 20 may be constructed closely similar to baler 10 in FIG. 1 and to the baler as disclosed in the incorporated U.S. Pat. No. 6,679,042.

Figure 2:
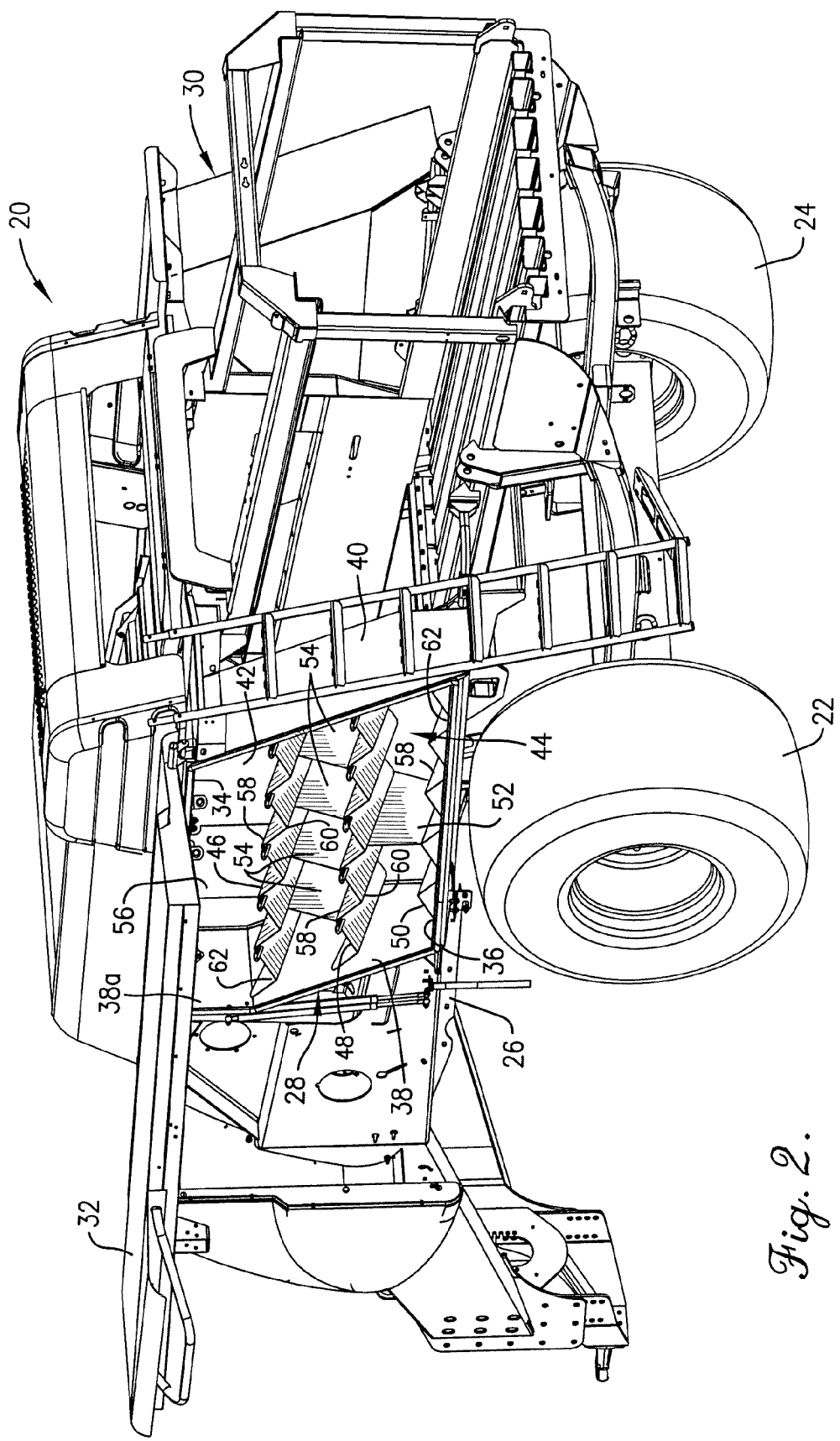
FIG. 2 is a left rear isometric view of portions of the wheeled frame of a large rectangular baler incorporating a twine storage box in accordance with the principles of the present invention.
Figure 4:
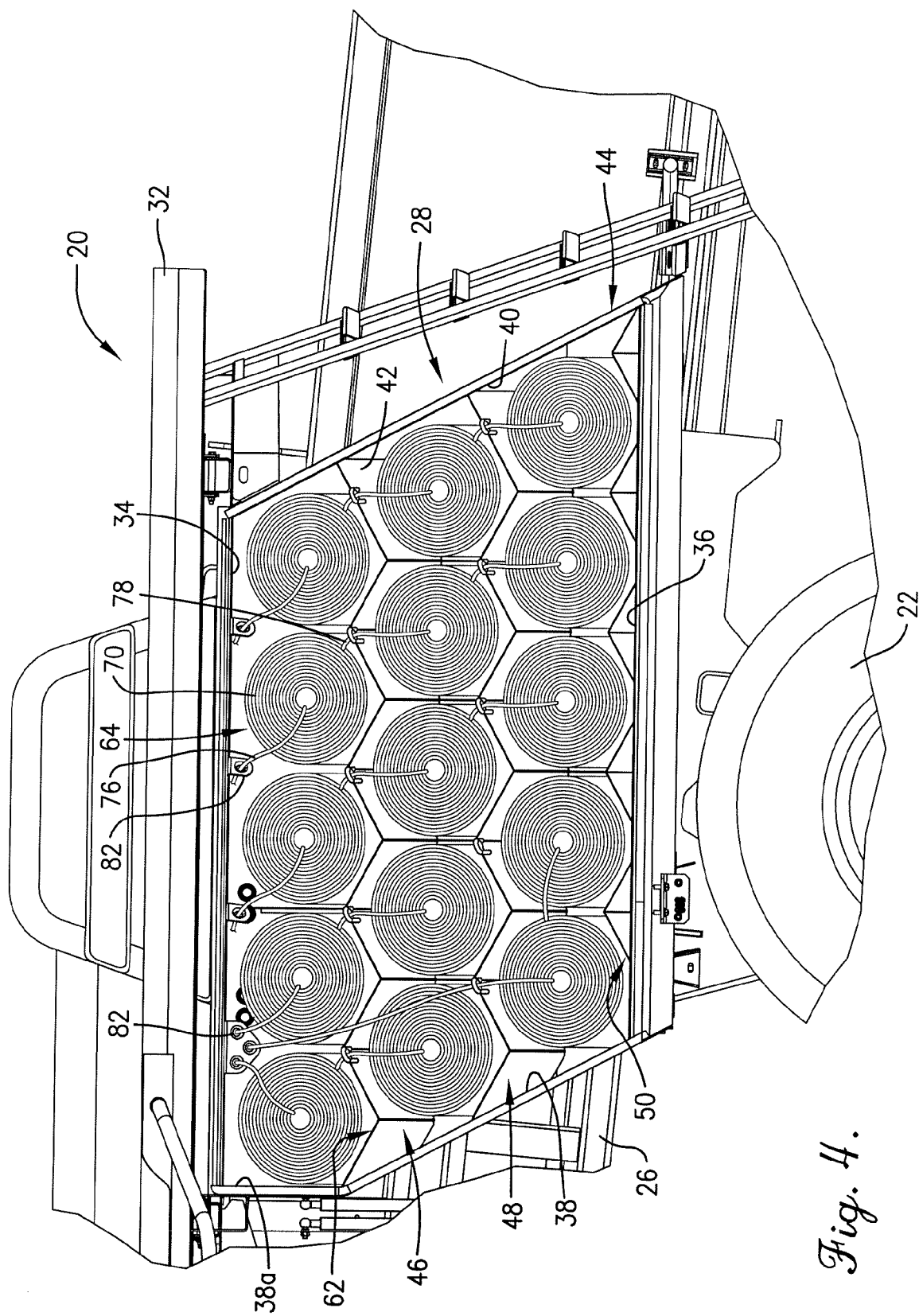
FIG. 4 is an enlarged left side elevational view of the twine box area showing the twine box filled with a full supply of twineballs.
Figure 5:
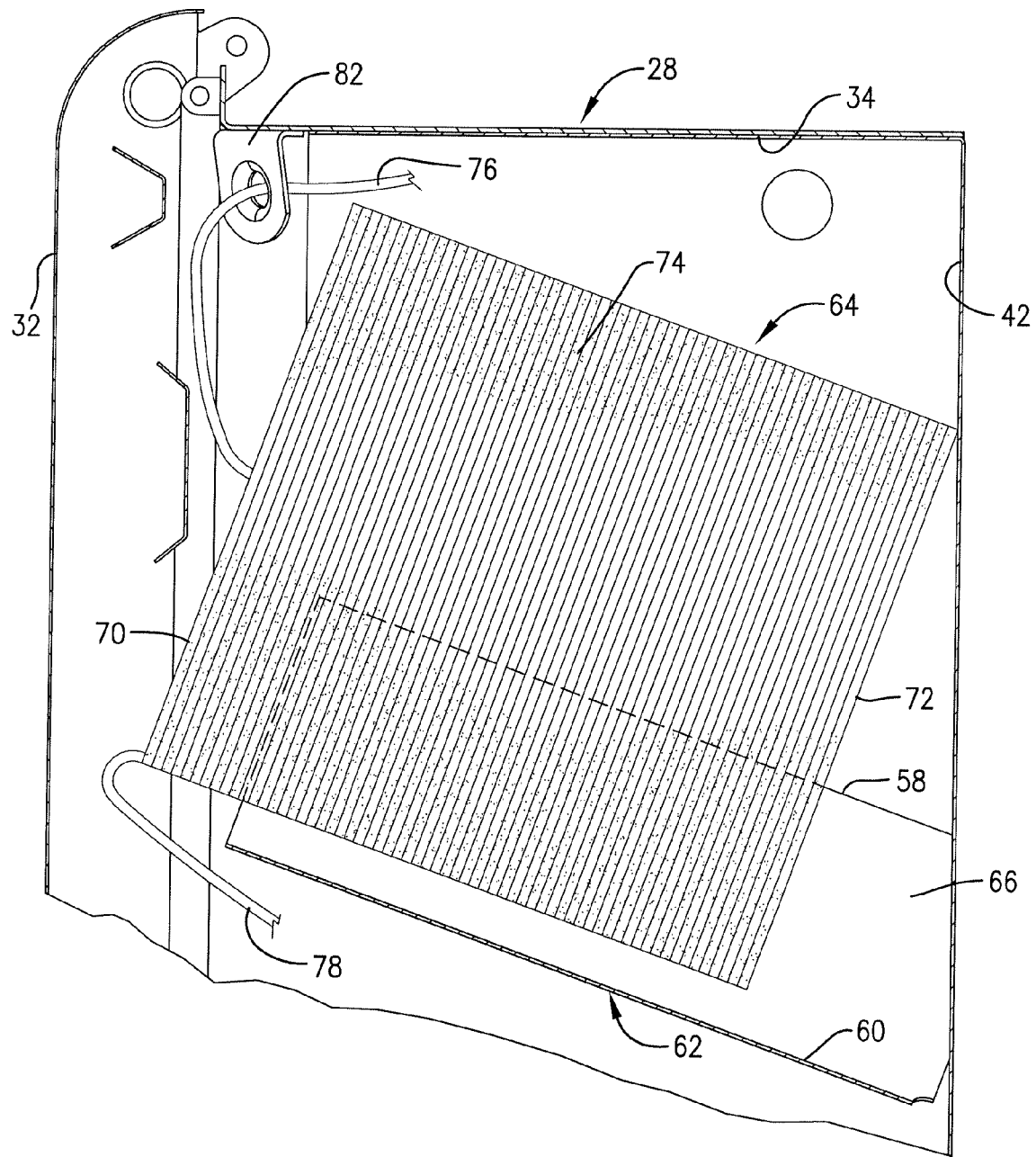
FIG. 5 is an enlarged, fragmentary vertical cross sectional view through the twine box area in the machine of FIGS. 2-4 illustrating the manner in which the twineball is supported at an angle in the box, the access door of the twine box being shown in a closed position.

As illustrated, baler 20 includes a pair of ground wheels 22 and 24 that support a chassis or frame 26 for movement through the field. Twine storage apparatus in the nature of a pair of twine boxes 28 and 30 are supported on opposite left and right sides of frame 26 for storing balls of twine used in binding bales formed within baler 20. Each twine box 28, 30 has a door 32 that is hinged along its top edge for swinging movement between an open position as illustrated in FIGS. 2, 3, and 4 and a closed position as illustrated in FIG. 5. The fore-and-aft length of door 32 is such that, when closed, it covers not only the twine storage area of box 28, but also a forward region of frame 26 in which various other components and mechanisms of the baler 20 are located.

Twine boxes 28 and 30 are of identical construction, except for the fact that they are mirror images of one another. Accordingly, the following description will be set forth with respect to left twine box 28, it being understood that such description applies equally as well for right twine box 30.

In addition to door 32, twine box 28 includes a top wall 34, a bottom wall 36, a pair of sidewalls 38 and 40, and a back wall 42. Back wall 42 is disposed in an upright plane that extends fore-and-aft, while walls 34-40 project outwardly from back wall 42 in a direction transverse to the normal direction of travel of baler 20. Overall, top wall 34, bottom wall 36 and sidewalls 38, 40 define an enclosure that is generally in the shape of a skewed parallelogram as viewed in elevation from the left side of baler 20. Sidewalls 38, 40 thus lean forwardly at approximate 60° angles, while top wall 34 is displaced somewhat forwardly of bottom wall 36. A short upper portion 38a of sidewall 38 extends vertically to its junction with top wall 34, rather than continuing the inclined attitude of the lower remaining portion of sidewall 38.

Walls 34-40 and back wall 42 cooperate to define a compartment 44 within which are disposed three transversely corrugated shelves 46, 48 and 50 that extend horizontally in a fore-and-aft direction. Shelves 46, 48 and 50 are arranged one above the other in superimposed relationship. Each shelf 46, 48 and 50 spans the sidewalls 38 and 40 and projects outwardly from back wall 42 to an outer edge that is recessed slightly with respect to the outer edges of walls 34-40. Preferably, each shelf 46, 48 and 50 is inclined slightly in an outward and upward direction. A single, upright strut plate 52 is disposed between lower shelf 50 and middle shelf 48 to help support shelf 48, while four such strut plates 54 extend between middle shelf 48 and top shelf 46 to provide extra support for top shelf 46. A hanging divider 56 is also provided between top shelf 46 and top wall 34.

The transversely corrugated nature of each shelf 46, 48, and 50 results in alternating peaks 58 and valleys 60. Such peaks and valleys in each shelf thereby create a series of side-by-side cradles 62, such cradles being sized to accept and retain twineballs 64 when the balls are laid on their sides as illustrated in FIGS. 4 and 5. Each cradle 62 has a pair of downwardly converging bottom walls 66 and 68 that intersect at the common valley 60. It will be appreciated that while in the preferred embodiment cradles 62 are formed by solid bottom surfaces in the nature of the walls 66 and 68, that function could also be provided by perforated walls or other types of supporting structures such as, for example, rods or pins.

The shelves 46, 48 and 50 are offset from one another in a fore-and-aft direction in such a manner that the peaks 58 of one shelf are vertically aligned with the valleys 60 of the next shelf above or below. This causes the cradles 62 to be correspondingly offset from row-to-row so that, as illustrated perhaps best in FIG. 4, the cradles 62 are arranged not only in horizontal rows corresponding to the shelves 48-50, but also in upright columns that are upwardly and forwardly inclined. Thus, when twine box 28 is filled with twineballs 64 as illustrated in FIG. 4, the balls 64 are correspondingly arranged in both horizontal, fore-and-aft extending rows and upright, forwardly and upwardly inclined columns that are consistent with the skewed parallelogram configuration of the box 28. The center of each ball is disposed at a point that is one-half the distance between the centers of a pair of twineballs in the next row above or below. It will be appreciated that as a result of this pattern, the maximum number of twineballs 64 can be stored within the minimum amount of space.

In a preferred embodiment, each twineball 64 is generally cylindrical in overall configuration, presenting an outer end 70, a back end 72, and a circumferentially extending, arcuate side 74. Each twineball 64 is typically supplied by the manufacture in a plastic wrap (not shown) with front end 70 exposed and with both leading and trailing twine ends 76, 78 respectively disposed adjacent the front end 70 of the ball. Each ball 64 is wound in such a way that it may be unwound or paid out from the inside out by pulling on leading twine end 76. Trailing end 78 is thus the last part of each ball to be paid out. Suitable twineballs are available from a number of sources well known to those skilled in the art, including, for example, Bridon Cordage of Albert Lea, Minn.

As illustrated in FIGS. 4 and 5, the twineballs 64 are advantageously oriented so that they lie on their sides 74 within cradles 62 with twine-dispensing, front ends 70 facing outwardly away from the baler. This permits the operator standing beside baler 20 to have easy access to leading twine ends 76 and trailing twine ends 78 for the purpose of splicing twineballs together in several groups to facilitate continuous flow of twine until all of the balls are paid out. The leading twine end 76 of one ball in a group is tied to the trailing twine end 78 of the next twineball in the group.

Each shelf 46-50 has a series of rigid eyelets 80 along the front edge thereof at peaks 58, i.e., one for each cradle 62, to help guide the twine from one ball to the next in the group of spliced together balls. Additional eyelets 82 are provided along the front edge of top wall 34 for the purpose of guiding the twine strands away from the balls and toward needles and knotters (not shown) used in connection with binding of the bales.

It should be apparent from the foregoing description that the present invention provides a space-saving yet very convenient arrangement for twineball storage. By having the twineballs face outwardly with their leading and trailing twine ends 76, 78 correspondingly facing the operator instead of facing upwardly or downwardly, it is much easier for the operator to splice the balls together when the operator loads the box 28 with a new supply. Furthermore, by having the cradles of each row offset in a fore-and-aft direction with respect to the cradles of the next adjacent row above or below, considerable space saving can be achieved without compromising the operator's access to twine ends 76, 78 for splicing operations and otherwise. The balls are well contained and nested within their cradles 62, and with the cradles 62 angled slightly upwardly and outwardly, there is no tendency for the balls to fall off the shelves and out of the box.

ALTERNATIVE EMBODIMENTS

Figure 9:
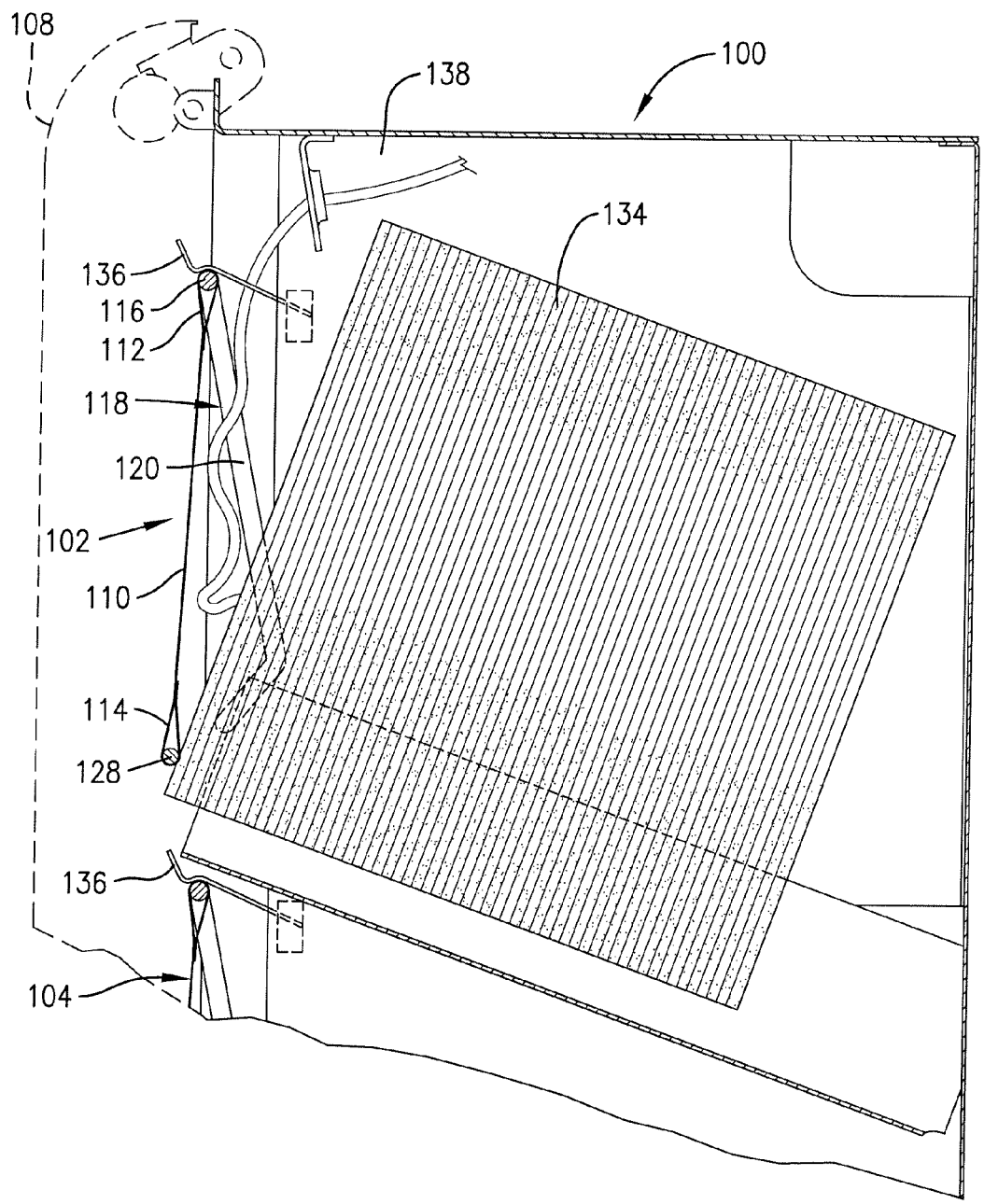
FIG. 9 is an enlarged, fragmentary vertical cross-sectional view of the embodiment of FIG. 7 illustrating the manner in which the fabric guard interacts with the end of a twineball.

FIGS. 7-9 are directed to an alternative embodiment wherein mesh fabric guards are utilized on the twine box to prevent the accidental escape of twine that may have a tendency to unspool itself from the twineballs under certain conditions. In this regard, during the bale tying cycle of the machine, the needles of the tying mechanism abruptly pull lengths of twine from at least certain of the balls in order to feed the twine to the knotter mechanism. Sometimes the momentum of this abrupt action causes surplus slack to be paid out from the involved twineballs, which then hangs loosely behind the closed door of the twine box. Then, when the door is opened by the operator to inspect or replace twineballs, the accumulated slack drops toward the ground and starts unspooling additional twine from the center of the twineball. Once the unspooling action begins, it is difficult to stop, particularly where more than one twineball is involved. This tendency to "self-unspool"is particularly prevalent on twineballs that are more than two-thirds depleted.

In order to alleviate this problem, the twine box 100 of FIGS. 7-9 is provided with three swing-down guards 102, 104 and 106, one for each row of twineballs in box 100. In a preferred embodiment, each guard 102, 104 and 106 extends the full length of its row of twineballs, although each guard could be divided into multiple such guards with each guard covering only a portion of the row if desired. Each guard 102, 104 and 106 is selectively positionable in either an upright closed position as exemplified by the guards 102 and 104 in FIG. 7, or a swung down, open position as exemplified by the lower guard 106 in that figure. Guards 102, 104 and 106 do not replace the main door of the twine box but, instead, are used in addition to it as illustrated, for example, in FIG. 9 wherein the main door 108 is illustrated in phantom in its closed position. In order to open one or more of the guards 102, 104 and 106, the main door 108 must be first be opened.

Each guard 102, 104 and 106 preferably comprises as a primary element thereof a flexible web of material, preferably but not necessarily an open mesh or net-like material. One satisfactory vinyl covered mesh fabric material is available from American Home and Habitat Inc. of Squires, Mo.

Each web 110 is rectangular in overall configuration and has a pair of elongated loops 112 and 114 extending along and comprising the opposite longitudinal marginal edges of the web 110. The top loop 112 receives the horizontally extending main rod 116 of a generally U-shaped frame 118 that supports web 110. Frame 118 also includes a pair of laterally extending rod legs 120 at opposite ends of main rod 116 that serve to attach frame 118 to twine box 100. In this respect, as perhaps illustrated best in FIG. 8, each leg 120 is provided with an outturned tip 122 pivotally received within a hole 124 in a mounting bracket 126 to render the frame 118 swingable between its open and closed positions. Preferably, each leg 120 of frame 118 is somewhat L-shaped as illustrated perhaps best in phantom lines in FIG. 9.

The lower loop 114 of each web 110 receives an elastic cord 128 having a pair of hooks 130 at its opposite ends. Each hook 130 is adapted to be hooked onto its proximal bracket 126 through a hole 132 located a short distance below hole 124. As illustrated particularly in FIGS. 8 and 9, holes 132 are so located that elastic cord 128 bears against the ends of the twineballs 134 near the lower extremity thereof. Thus, web 110 forms a type of safety net that receives and catches surplus unspooling twine as illustrated, for example, in FIGS. 7 and 9.

The open mesh nature of web 110 is helpful from a visibility standpoint as it permits the operator to view the condition of the twineballs without removing the guards from their raised and closed positions. A suitable retainer, such as a spring clip 136, maybe provided to selectively and releasably hold each guard 102, 104 and 106 in its closed position. In the illustrated embodiment, each spring clip 136 is attached at an inner end to an upright strut plate 138 of the twine box, while the outer end of the retainer is disposed to matingly receive and retain the upper extremity of the guard in engagement with the exterior of the upper loop 112 that receives main rod 116 of frame 118. A simple manual lifting of clip 136 releases the guard and allows it to swing down to its open, access position as exemplified by the guard 106 in FIG. 7, while the guard will automatically be relatched by clip 136 when the guard is returned to its raised and closed position.

Figure 10:
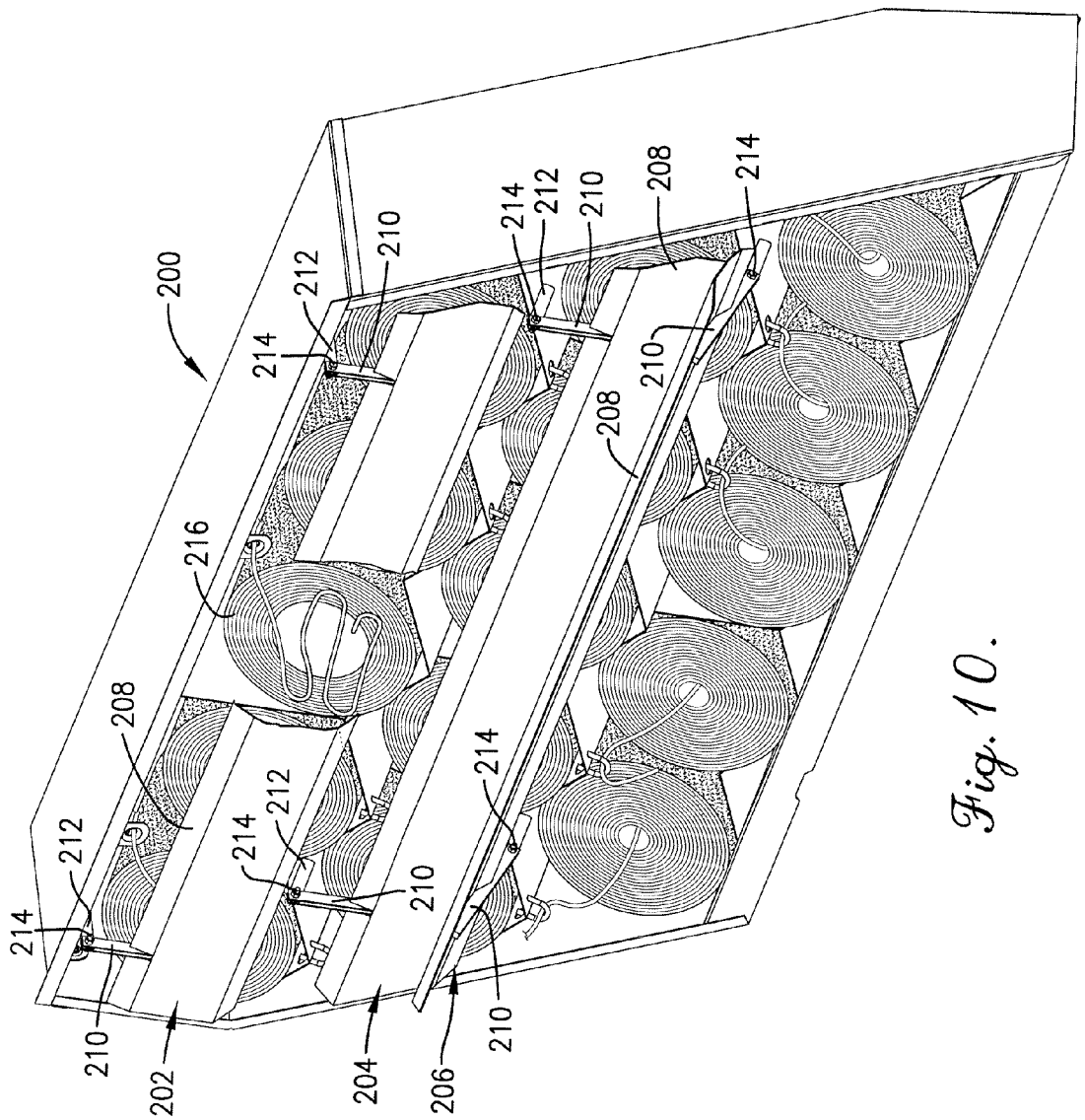
FIG. 10 is an enlarged isometric view of a second alternative embodiment wherein the twine box is provided with swing-up solid panel guards for preventing the accidental unspooling and escape of twine from the twineballs.
Figure 11:
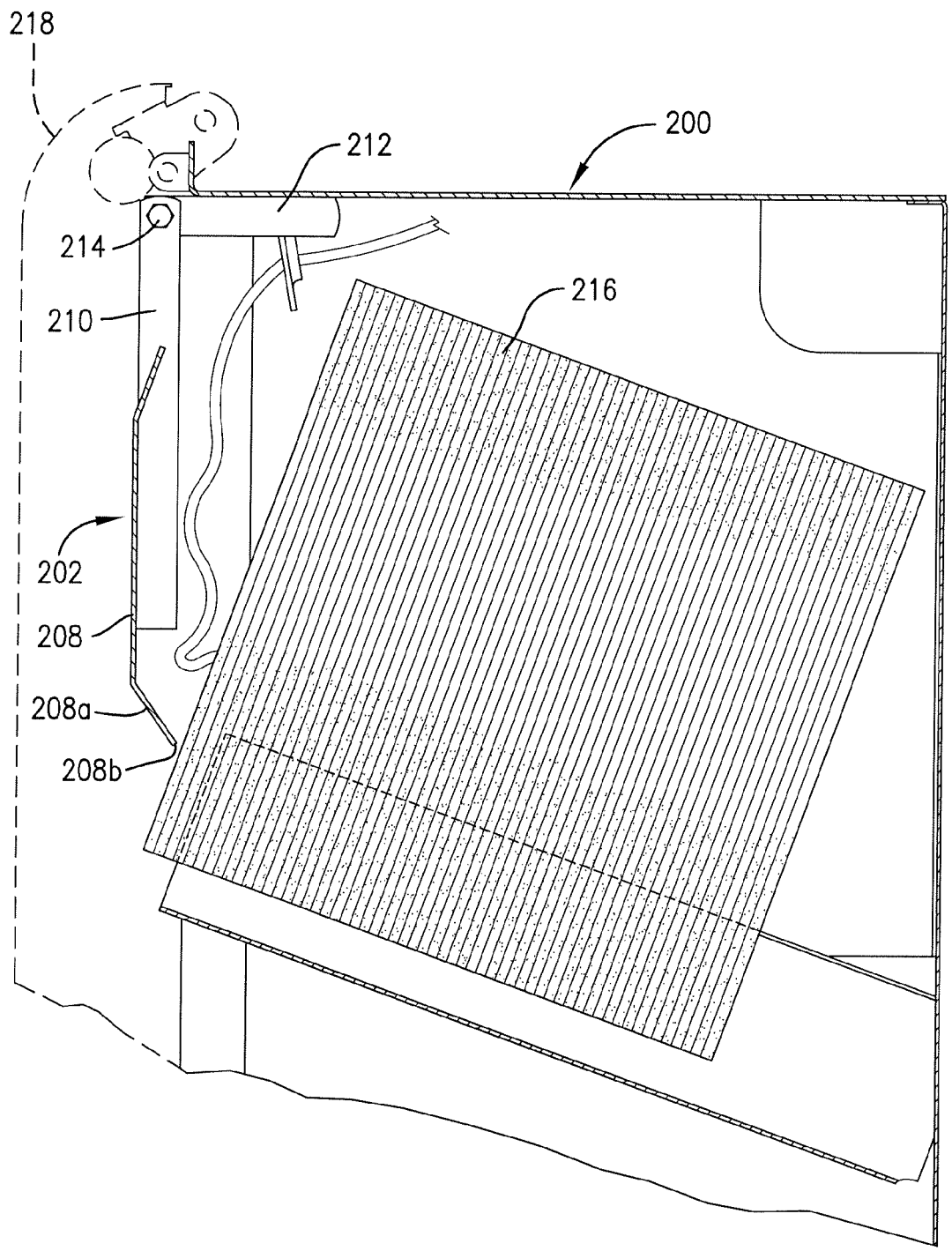
FIG. 11 is an enlarged, fragmentary vertical cross-section view of the embodiment of FIG. 10 illustrating the manner in which the solid panel guard interacts with the end of a twineball.

FIGS. 10 and 11 relate to a second alternative embodiment showing a twine box 200 having guards 202, 204 and 206 wherein the guards are solid panels 208 rather than flexible fabric. In the illustrated embodiment, each panel extends the full length of the row of twineballs, although each panel could be subdivided into a plurality of separate panels if desired.

In the illustrated embodiment, each guard 202, 204 and 206 is mounted for selective movement between an upright, closed position as illustrated by guards 202 and 204 in FIG. 10, and an upwardly swung, open position as exemplified by the guard 206 in that same figure. Each panel 208 includes a pair of transversely extending mounting arms 210 that are located adjacent opposite ends of the panel and project laterally from the upper edge thereof. Such mounting arms 210 are hingedly connected to twine box 200 by a mounting strap 212 that is fixed to the twine box 200, and by a horizontally extending hinge bolt 214. In a preferred embodiment, each mounting arm 210 is comprised of a pair of slightly spaced apart members that embrace the mounting strap 212 on opposite sides thereof. Hinge bolt 214 serves to clamp the two members of arm 210 against opposite sides of strap 212 so as to provide frictional resistance to swinging of the panel 208 between open and closed positions. Thus, in the closed position, each panel 208 tends to remain in such position due to the force of gravity and the frictional interaction at pivot bolt 214, while in the open position, each panel 208 is yieldably restrained against gravitational closing by friction alone.

As illustrated in FIG. 11, each panel 208 is formed so as to be slightly concave, with its concave side facing inwardly toward the proximal end of the bale 216. Such concave configuration causes panel 208 to present a lowermost inturned margin 208*a* having an innermost edge 208*b* that is disposed in close proximity to or touching the proximal end of twineball 216 adjacent its lower portion thereof This close, intimate relationship between lower edge 208*b* and the end of the twineball 216 positions the panel 208 to capture and retain surplus slack portions of twine from ball 216 as illustrated in FIGS. 10 and 11, similar to the guards 102, 104 and 106 in the embodiment of FIGS. 7-9.

Figure 12:
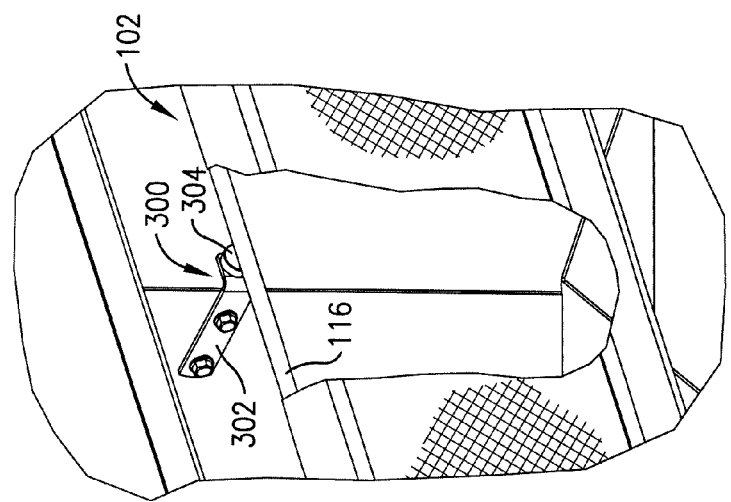
FIG. 12 is an enlarged, fragmentary isometric detail view of a third alternative embodiment wherein the device for holding the swing-down fabric guards in their raised position may comprise a magnetic latch.

FIG. 12 illustrates a third alternative embodiment wherein each of the spring clip latches 136 for the mesh fabric guards of FIGS. 7-9 is replaced by a magnetic latch 300. The latch 300 includes a generally L-shaped mounting bracket 302 bolted to a strut plate 138 in such a position that a magnetic disc 304 at the outer end of bracket 302 is disposed to be engaged by the metal rod 116 of the guard 102, 104, or 106 when the guard is raised to its closed position. The strength of magnetic disc 304 is such that its attraction for rod 116 maybe overcome by manually pulling on rod 116, yet it remains engaged with rod 116 during field operations and at other times. Latch 300 thereby releasably retains its guard in the closed position.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a crop baler that uses twine from twineballs to bind a bale produced by the baler, an improved twineball storage apparatus comprising:
    a twine box having a plurality of superimposed, generally horizontally extending rows of cradles,
    said rows of cradles being configured for supporting stored generally cylindrical twineballs on their cylindrical sides with twine dispensing ends thereof facing generally horizontally outwardly away from the baler,
    said rows of cradles being vertically spaced apart when the baler is viewed in side elevation; and
    a plurality of twine guides positioned adjacent to an outer end of the twine box and adjacent to an outer end of the cradles.

2. In a crop baler as claimed in claim 1,
    said baler comprising a rectangular baler.

3. In a crop baler as claimed in claim 1,
    said cradles being further arranged in a plurality of side-by-side, upright columns.

4. In a crop baler as claimed in claim 3,
    said cradles in one row being laterally offset with respect to the cradles of another row such that the columns are inclined.

5. In a crop baler as claimed in claim 4,
    each of said cradles having a pair of downwardly converging bottom walls.

6. In a crop baler as claimed in claim 5,
    said bottom walls of one cradle in a row being interconnected with the bottom walls of a next adjacent cradle in the row to form a shelf.

7. In a crop baler as claimed in claim 6,
    said shelf being outwardly and upwardly inclined.

8. In a crop baler as claimed in claim 7,
    said baler comprising a rectangular baler.

9. in a crop baler as claimed in claim 1,
    said cradles being outwardly and upwardly inclined.

10. In a crop baler as claimed in claim 9,
    the cradles being arranged such that the center of each twineball is located at a point that is one-half the distance between the centers of a pair of twineballs in a next upper or lower row of twineballs.

11. In a crop baler as claimed in claim 1
    the cradles being arranged such that the center of each twineball is located at a point that is one-half the distance between the centers of a pair of twineballs in a next upper or lower row of twineballs.

12. In a crop baler as claimed in claim 1,
    each of said cradles having a pair of downwardly converging bottom walls.

13. in a crop baler as claimed in claim 1,
    at least certain of the cradles being mutually interconnected to form a shelf.

14. In a crop baler as claimed in claim 1,
    further comprising a guard at an outboard end of at least one of said cradles in disposition for preventing the escape of twine from a twineball held in the cradle.

15. In a crop baler as claimed in claim 14,
    said guard comprising a generally upright web of flexible material.

16. In a crop baler as claimed in claim 15,
    said guard further comprising a length of resilient material along a lower stretch of said web yieldably biasing the web in a direction to engage the proximal end of the twineball when the twineball is supported on the cradle.

17. In a crop baler as claimed in claim 15,
    said web of flexible material being foraminous.

18. In a crop baler as claimed in claim 16,
    said web of flexible material being supported on a frame movable between an upright closed position covering the twineball and a swung down open position permitting access to the twineball.

19. In a crop baler as claimed in claim 18,
    said frame including an inverted, generally U-shaped rod having a pair of laterally spaced legs and an upper transverse bight interconnecting said legs,
    said web being attached to said bight.

20. In a crop baler as claimed in claim 19,
    further comprising a latch releasably engaging said bight to retain the guard in said closed position.

21. In a crop baler as claimed in claim 20,
    said latch comprising a spring clip.

22. In a crop baler as claimed in claim 20,
    said latch comprising a magnetic component.

23. In a crop baler as claimed in claim 18,
    further comprising a latch releasably retaining the guard in said closed position.

24. In a crop baler as claimed in claim 14,
    said guard comprising a generally upright panel configured for blocking the descent of twine from a twineball in the cradle.

25. In a crop baler as claimed in claim 24,
    said panel being mounted for movement between an upright closed position for generally covering the end of the twineball when the twineball is supported in the cradle and an upwardly swung open position permitting access to the twineball in the cradle.

26. In combination:
    a crop baler that uses twine to bind a bale produced by the baler; and
    a plurality of generally cylindrical twineballs,
    each of said twineballs having a pair of opposite ends and a cylindrical side extending between said ends,
    said crop baler including support members for supporting the twineballs on their cylindrical sides,
    one end of each twineball comprising a twine dispensing end of the twineball from which twine is dispensed to other parts of the baler,
    said twineballs being supported on the baler with said twine dispensing end thereof facing generally horizontally outwardly away from the baler.

27. The combination as claimed in claim 26,
    said support members comprising a plurality of cradles for effecting said support of the twineballs.

28. The combination as claimed in claim 27,
    said cradles being arranged in a plurality of superimposed, horizontal rows and side-by-side, upright columns.

29. The combination as claimed in claim 28,
    said cradles in one row being laterally offset with respect to the cradles of another row such that the columns are inclined.

30. The combination as claimed in claim 29,
    each of said cradles having a pair of downwardly converging bottom walls.

31. The combination as claimed in claim 30,
said bottom walls of one cradle in a row being interconnected with the bottom walls of a next adjacent cradle in the row to form a shelf.
32. The combination as claimed in claim 31,
said shelf being outwardly and upwardly inclined.
33. The combination as claimed in claim 26,
said baler comprising a rectangular baler.
34. The combination as claimed in claim 26,
said twineballs being supported in such a manner that they are outwardly and upwardly inclined.
35. The combination as claimed in claim 26,
said twineballs being supported in a plurality of superimposed, horizontal rows and side-by-side, upright columns.
36. The combination as claimed in claim 35,
the twineballs in one row being laterally offset with respect to the twineballs of another row such that the columns are inclined.
37. The combination as claimed in claim 36,
the twineballs being arranged such that the center of each twineball is located at a point that is one-half the distance between the centers of a pair of twineballs in the next upper or lower row of twineballs.
38. The combination as claimed in claim 26,
the twineballs being arranged such that the center of each twineball is located at a point that is one-half the distance between the centers of a pair of twineballs in a next upper or lower row of twineballs.
39. The combination as claimed in claim 26,
each of said twineballs being supported by a pair of downwardly converging bottom walls.
40. The combination as claimed in claim 39,
said bottom walls projecting outwardly and upwardly at an incline.
41. The combination as claimed in claim 26,
further comprising a guard on the baler adjacent said one end of at least one twineball in disposition for preventing the escape of twine from said at least one twineball.
42. The combination as claimed in claim 41,
said guard comprising a generally upright web of flexible material.
43. The combination as claimed in claim 42,
said guard further comprising a length of resilient material along a lower stretch of mid web yieldably biasing the web in a direction to engage said one end of the twineball.
44. The combination as claimed in claim 42,
said web of flexible material being foraminous.
45. The combination as claimed in claim 43,
said web of flexible material being supported on a frame movable between an upright closed position covering the twineball and a swung down open position permitting access to the twineball.
46. The combination as claimed in claim 45,
said frame including an inverted, generally U-shaped rod having a pair of laterally spaced legs and an upper transverse bight interconnecting said legs,
said web being attached to said bight.
47. The combination as claimed in claim 46,
further comprising a latch releasably engaging said bight to retain the guard in said closed position.
48. The combination as claimed in claim 47,
said latch comprising a spring clip.
49. The combination as claimed in claim 47,
said latch comprising a magnetic component.
50. The combination as claimed in claim 45,
further comprising a latch releasably retaining the guard in said closed position.
51. The combination as claimed in claim 41,
said guard comprising a generally upright panel configured for blocking the descent of twine from said one end of the twineball.
52. The combination as claimed in claim 51,
said panel being mounted for movement between an upright closed position for generally covering said one end of the twineball and an upwardly swung open position permitting access to the twineball.

* * * * *